March 3, 1936.   J. J. HANLEY   2,033,070
VOLTAGE REGULATING POWER SUPPLY APPARATUS
Filed May 24, 1933   3 Sheets-Sheet 1

Inventor.
John J. Hanley
by Heard Smith & Tennant.
Attys

March 3, 1936. J. J. HANLEY 2,033,070
VOLTAGE REGULATING POWER SUPPLY APPARATUS
Filed May 24, 1933 3 Sheets-Sheet 2

Inventor.
John J. Hanley
by Heard Smith & Tennant
Attys.

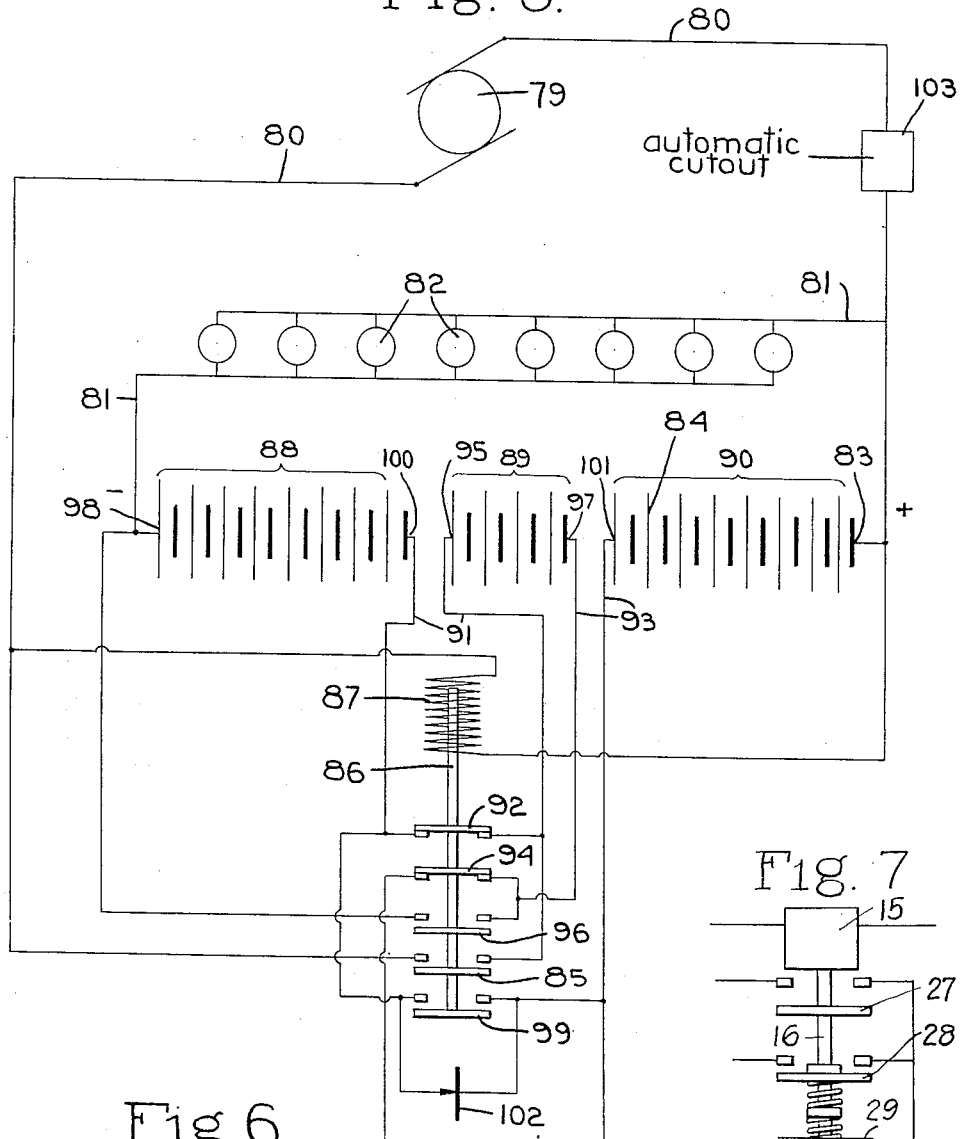
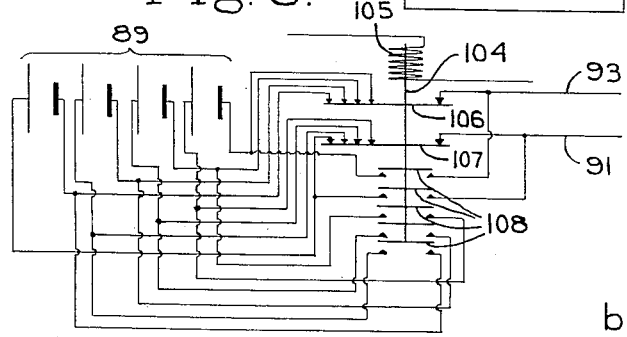
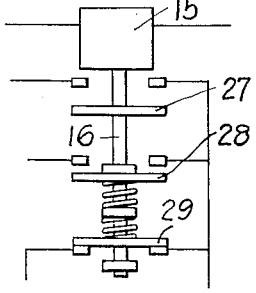

Patented Mar. 3, 1936

2,033,070

UNITED STATES PATENT OFFICE 2,033,070

VOLTAGE REGULATING POWER SUPPLY APPARATUS

John J. Hanley, Jamaica Plain, Mass.; Thomas F. Haley, Boston, Mass., executor of said John J. Hanley, deceased Application May 24, 1933, Serial No. 672,615

12 Claims. (Cl. 171—314)

This invention relates to voltage regulating power supply apparatus and has for its principal object to provide means for altering the voltage characteristic of the load current without interruption of flow of the current and without substantial drop in the altered voltage supplied to the load.

A further object of the invention is to provide a power supply apparatus in which one or more voltage generating units may be added in series to a source of power while such source of power is supplying current to the load or to move one or more of such units from their power supplying positions in the circuit without interruption of the current flow to the load or without substantial change in the altered voltage of such current.

A further object of the invention is to provide a power supply apparatus in which a load circuit is supplied normally by two sources of current acting simultaneously to supply power to the load, one of such sources generating a higher voltage than the other and in which when the high voltage source fails or its voltage decreases a substantial amount, the other source will automatically change its voltage characteristic to equal or exceed that of the other source, such change taking place with no interruption of current flowing to the load.

A further object of the invention is to provide a power supply apparatus having two sources of current, one of which is a pulsating rectified source of current and the other of which connected thereto has a voltage substantially equal to the minimum voltage of the pulsating source and in which the mean voltage on the load is maintained substantially constant when a change is made from one source to the other, such change being accomplished without interruption of current flowing to the load.

Other objects and features of the invention will more fully appear from the following specification in connection with the accompanying drawings and will be particularly pointed out in the claims.

In the drawings:

Fig. 5 is a diagrammatic view illustrating the application of the invention to a voltage regulating power supply apparatus for illuminating a railroad car or other instances where the primary source of current is intermittent.

Fig. 6 illustrates diagrammatically a series parallel switch for changing connections in the shifted section of the battery shown in Fig. 5.

Fig. 7 is a detail view of a portion of the elements shown in Fig. 2.

A simple embodiment involving the broad principles of the invention comprises briefly a composite source of electrical energy acting to supply power to a load. The source may be a simple, multicell battery or a more complex system comprising a battery, a generator, a rectifier or any combination of these units. Combined with the system comprising the energy source is a means for altering the connections between the various units thereby to maintain constant or to change the voltage impressed upon the load, such change of connections being accomplished with no interruption of, or substantial drop in, the altered voltage in the current flowing to the load.

Figure 1:
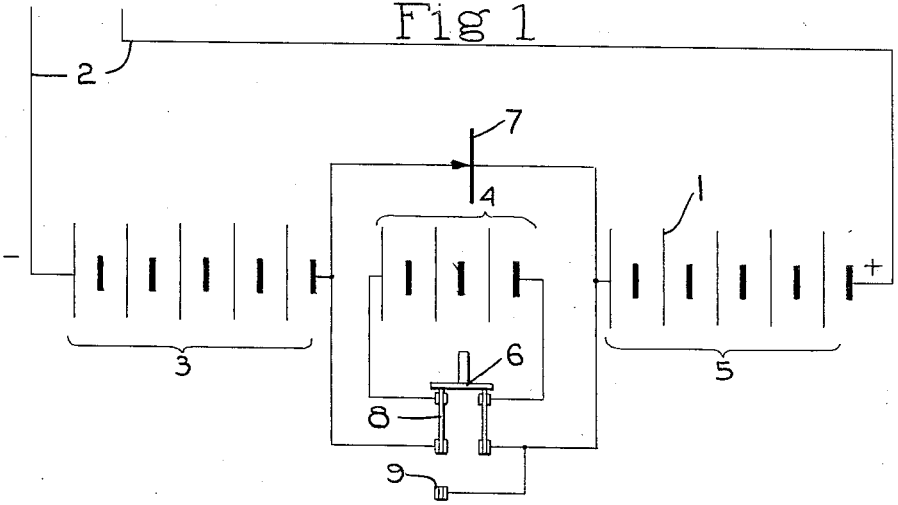
Fig. 1 is a diagrammatic view illustrating a fundamental embodiment of the invention.

A particular embodiment of the invention is illustrated diagrammatically in Fig. 1, in which a source of current I is connected to an external or load circuit 2. The source I is composed of a plurality of voltage generating units connected in series. Each of these units may be one or a group of unitary subdivisions of the current source. Within each of the units the subdivisions may be connected in series, series parallel or in suitable arrangement depending on the character of the load.

In Fig. 1 a multicell battery is employed which is divided into three voltage generating groups or units, 3, 4 and 5. The inner terminals of groups 3 and 5 and the outer terminals of group 4 are connected through the double pole switch 6. As shown in the drawings, the three groups are connected in series and are therefore impressing their combined voltages upon the load. The switch 6 may have two positions, one of which interconnects all of the units of the current source while the purpose of the other position will be described hereinafter. A unidirectional conductor 7 is connected across the inner terminals of the groups 3 and 5. With the switch 6 in the position shown in the drawings, the unidirectional conductor is also connected across the group 4. The unidirectional conductor is so connected that it prevents the discharge of this group and insures that practically no current flows locally through this group of cells and the connections leading to the unidirectional conductor.

When the switch 6 is open, the voltage of the group 4 is subtracted from the total voltage impressed on the load without interruption of current flow to the load because the unidirectional conductor 7 freely permits current to flow between groups 3 and 5 after group 4 has been removed from the circuit. When the switch 6 is in its open position, therefore, the load is being supplied with current flowing from the unit 3 through the unidirectional valve 7 through the unit 5 and thence to the load. If it is desirable to provide an additional path for the current to flow around the unidirectional conductor after the switch has been opened, the switch 6 may be thrown into such position that the knife 8 of the switch makes contact with the connection 9, thus short-circuiting the unidirectional conductor.

Obviously the current source may be divided into any number of units each of which may be supplied with a switch and a unidirectional conductor and thereby provide means for including or eliminating one or any number of voltage generating units from the load circuit. Furthermore, a portable apparatus may be constructed embodying the principles of the invention which is adapted to be temporarily connected to any portion of the current source while a portion of that source embraced by the apparatus is removed from, inserted in, or a new unit replaced in, the main current source. The switch 6 may be replaced by an automatic means to accomplish the same result as that above set forth upon the fulfillment of some predetermined condition.

The term "unidirectional conductor" as used herein applies to a rectifying device of the dry contact type which permits flow of current in one direction and substantially prevents flow of current in the other direction. The term "unidirectional" is not strictly accurate since a very slight flow of current may take place in a direction opposite to that of its free flow. The term is used, however, with the intention of expressing in simple terms the practical result obtained by the use of the device. For almost every practical purpose the leakage through the conductor may be disregarded. A simple and preferred type of such unidirectional conductor is disclosed in U. S. Patent No. 1,640,335.

Figure 2:
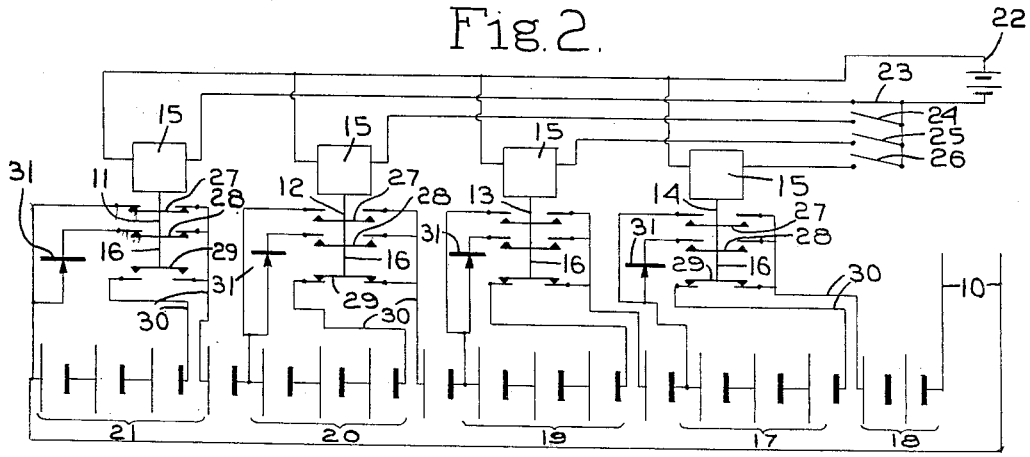
Fig. 2 is a diagrammatic view illustrating an embodiment of the invention having a wide range of voltage adjustment.

An efficient method of quickly and easily connecting or disconnecting a plurality of voltage generating units comprising a current source is illustrated in Fig. 2. The current source therein shown is composed of a plurality of voltage generating units connected in series. The interconnections between the various units and the load circuit are controlled by a plurality of switches 11, 12, 13 and 14. These switches may be of any suitable type. They may be directly manually operable or electrically actuated through a remote control switch. The latter type of switch is diagrammatically illustrated in Fig. 2 of the drawings. These switches are of standard construction having an upper position which is determined by energizing a solenoid 15 and a lower position which is obtained by movement of the switch arm 16 by means of gravity when the solenoid 15 is deenergized. As shown in the drawings, the switches 12, 13 and 14 are acting to close the circuit between their respective portions of the main power source. The switch 14 is acting to close the circuit between the portion 17 of the current source and its adjacent portion 18. The switch 13 is acting to connect the portion 19 of the current source to the load while the switch 12 is acting to connect the portion 20 of the current source to the load. The current source is connected to the load by means of the load circuit 10. The switch 11, as shown in the drawings, is acting to disconnect the section 21 from the load. The solenoids 15 of the switches 12, 13 and 14 are at this time deenergized while the solenoid of the switch 11 is energized by reason of its connection to the battery 22 or any other suitable source of current through the closed switch 23. The other solenoids may conveniently be energized by closing additional switches which control the flow of current from the battery 22. The switch 12 is controlled by means of the switch 24. The switch 13 is controlled by means of the switch 25 and the switch 14 is controlled by the switch 26. By manipulating the switches 23 to 26, inclusive, any number of the portions of the current source may be connected to the load circuit.

Each of the switches 11 to 14, inclusive, are provided with three contact arms 27, 28 and 29. The contact arms 29 act in each case to close the circuit 30 which connects adjacent terminals of the various portions of the current source. The contact arms 28 act to connect unidirectional conductors 31 in parallel with the portion of the current source embraced by each switch. The contact arms 27 of each of the switches act when closed to short-circuit the unidirectional conductors 31.

When the solenoids 15 are deenergized, the switch arms 16 fall by gravity into their downward position, at which time the contact arms 27 and 28 are open circuited and the contact arms 29 act to close the circuits 30. Upon energization of the solenoids 15, the various contact arms are so adjusted that the arm 28 acts first to close the circuit including the unidirectional conductors. The arm 29 acts directly thereafter to open the circuits 30. At this time the unidirectional valves are carrying the current to the load from the portions of the current source still in operation. The contact arms 27 are the last to be closed and when so closed act to short-circuit the unidirectional conductors. This series of operations takes place during the upward movement of the switch arms 16 and is or may be accomplished in the usual way by providing relative movement between the switch arms and the contact arms, such relative movement being obtained by means of suitable springs and the extent of this motion being determined by stop collars or other suitable means. By means of the apparatus shown in Fig. 2, it is obvious that all of the controlling switches may be manipulated from a remote point since the solenoids may be energized by a circuit of any desired length.

The contact arms 28 and 29 are slidably mounted on a switch arm 16, while the contact arms 27 are desirably fixed to the switch arms 16. Each of the arms 28 is engaged and urged upwardly by a spring, its upward motion being limited by a stop collar adjustably secured upon the switch arm 16. The arms 29 are engaged and urged downwardly by another spring, and their downward motion is limited by another stop collar adjustably secured upon the arms 16. Upon energization of one of the solenoids, the arm 28 thereof first makes contact with its cooperating contact members because the distance from this arm to such members is less than the distance between the arm 29 and its stop collar. During this portion of the motion of the arm 16 of the solenoid, the spring engaging the arm 29 maintains the circuit which it controls closed. As the switch arm 16 continues to move upwardly, the arm 29 is raised by its stop collar and the circuit 30 is opened. At this time, the battery section controlled by the switch is cut out by the circuit and the valve 31 acts to conduct the current.

The final upward movement of the switch arm 16 then acts to short-circuit the valve 31 by causing the arm 27 to engage its cooperating contacts. The arm 27 does not function until this time because the distance between the arm and its cooperating contacts is greater than the distance traveled by the switch arm 16, thus causing the contact arms 28 and 29 to function. The springs and their cooperating stop collars are illustrated in Fig. 7.

When the solenoid is de-energized, the arm 27 first breaks its contact, then the arm 29 closes its contacts, thus disconnecting the valve 31.

Figure 3:
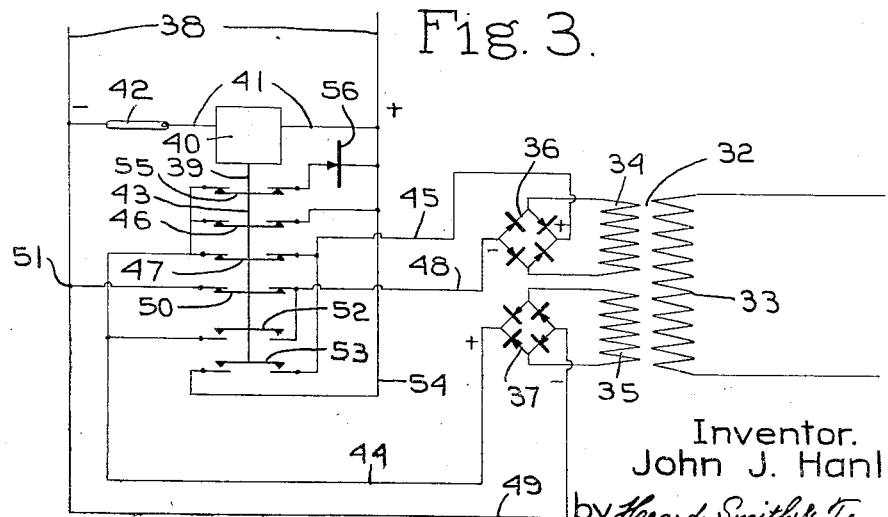
Fig. 3 is a diagrammatic view illustrating a voltage regulating power supply apparatus in which the voltage impressed upon the load is supplied by a plurality of secondary coils which are within the influence of a single primary coil of a transformer.

Fig. 3 of the drawings illustrates another application of the invention in which the current source is composed of a transformer 32 having a primary coil 33 and a double secondary composed of independent coils 34 and 35. The coils 34 and 35 are connected, respectively, to full-wave rectifiers 36 and 37, the output of which is connected to a load circuit 38 through a controlling switch 39. The switch 39 is desirably similar in construction to that described in connection with Fig. 2 and acts to connect the output from the rectifiers 36 and 37 either in parallel or in series and therefore applies to the load circuit 38 the combined voltage of the two rectifiers or the mean voltage of the rectifiers resulting from the parallel connection.

In this construction the solenoid 40 of the switch is energized from current obtained directly from the load circuit 38. Current from the load circuit is conducted to the solenoid through the circuit 41 in which the switch 42 is situated. As shown in the drawings, the switch 42 is closed, thereby energizing the solenoid 40 and lifting the switch arm 43 into its upper position, at which time the output of the rectifiers 36 and 37 are connected in parallel to the load circuit. At this time the positive terminals of the rectifiers are connected through the wires 44 and 45 to the positive side of the load circuit. The current flowing in the wire 44 is conducted through the contact arm 46 which is now closed to the load while the current flowing in the wire 45 is conducted through the contact arms 46 and 47 to the load. The minus terminals of the rectifiers are connected to the load through the wires 48 and 49. The wire 48 conducts current through the contact arm 50 to the minus side of the load circuit while the wire 49 conducts current directly to a permanent connection 51 upon the minus side of the load circuit.

When the switch 42 is opened, the switch arm 39 falls down by gravity, thereby opening the circuits previously closed by the contact arms 46, 47 and 50 and closing the circuits controlled by the contact arms 52 and 53. At this time current flows from the minus terminal of the rectifier 37 to the permanent connection 51 on the minus side of the load circuit. Current flowing from the plus terminal of the same rectifier flows through the wire 44, through the contact arm 52, and thence to the minus terminal of the rectifier 36 through the wire 48. The plus terminal of the rectifier 36 is connected to the wire 45 which conducts current through the contact arm 53 through the wire 54 to the plus side of the load circuit. An additional contact arm 55 is provided which controls the circuit leading to one of the terminals of a unidirectional valve 56, the other terminal of which is connected to the plus side of the load circuit. Relative motion is provided between the contact arm 55 and the switch arm 39 to insure that during the descent of the switch arm 39 the contact arms 46, 47 and 50 will first open their respective circuits and that the contact arms 52 and 53 will act immediately thereafter to close their respective circuits and that the contact arm 55 will be the last to open. During the period of time when the switch is changing connections between the rectifiers 36 and 37 and the load from a parallel arrangement to a series arrangement, the unidirectional conductor 56 acts to prevent interruption of current flowing to the load circuit and is thereafter disconnected from the circuit. The solenoid 40 may be specially wound so that it causes actuation of the switch arm 39 upon excitation by the voltage of the rectifiers when connected in parallel or in series. This apparatus thus provides means for changing the voltage impressed upon the load from that of the combined voltage of the rectifiers to the voltage resulting from their parallel connection. It will be noted in the apparatus shown in Fig. 3 that when the switch arm 39 is moving from its upper position to its lower position, the valve 56 is acting to conduct current from the rectifier 37 which at this time is independent of all other circuits in the system due to the fact that the secondary of the transformer 32 is composed of two independent sections 34 and 35. The current supplied to the load momentarily therefore through the valve 56 is supplied to the load at the voltage of the rectifier 37.

A very practical method of supplying current without interruption to the load under the condition where there is employed a commercial circuit of the desired voltage or which may be transformed to the desired voltage and then rectified is also herein disclosed.

This embodiment of the invention serves to exemplify the additional feature of the invention in which when the supplying source is changed not only is interruption of current flow prevented but the change is made without alteration of the voltage impressed on the load circuit.

The resulting rectified current, in the case referred to, is pulsating and consequently its voltage has a definite minimum and maximum value which may be widely different. This rectified current is connected to the load circuit. In order to prevent interruption of the current flowing to the load, however, another source of current must be available. Such other source of current desirably is a battery which may be a primary battery or a secondary battery. This source of supply is connected to the load and is provided with a unidirectional conductor in its circuit normally to prevent current flow therefrom to the load. When, however, the rectified source is interrupted or its voltage is substantially decreased, the unidirectional conductor will freely permit current to flow from the secondary source to the load. In this type of system, the voltage of the battery or secondary source should be maintained at such a value as to counteract the voltage generated by the rectified current.

When using a rectified source of current which is unfiltered in combination with a steady source of current such as a battery, difficulty arises in properly balancing the voltages between the two current sources. In order to insure that the voltage impressed upon the load does not change when the change from one source to the other is made, the voltage of the battery source should be made equal to the mean voltage generated by the rectified source. If such adjustment were made, however, with no compensating means, there would be a tendency for a flow of current to occur from the battery through the unidirectional conductor when the voltage value of the rectified source was at a minimum. Such flow of current would be quite appreciable since there would be a surge of current from the battery at every instant the rectified source reached its minimum voltage value. In order to prevent this discharge of the battery, the voltage of the battery must be reduced to the level of the minimum voltage of the rectified current and additional voltage must be supplied to the battery when the change is made from the rectified source to the battery in order to maintain a constant voltage on the load.

Figure 4:
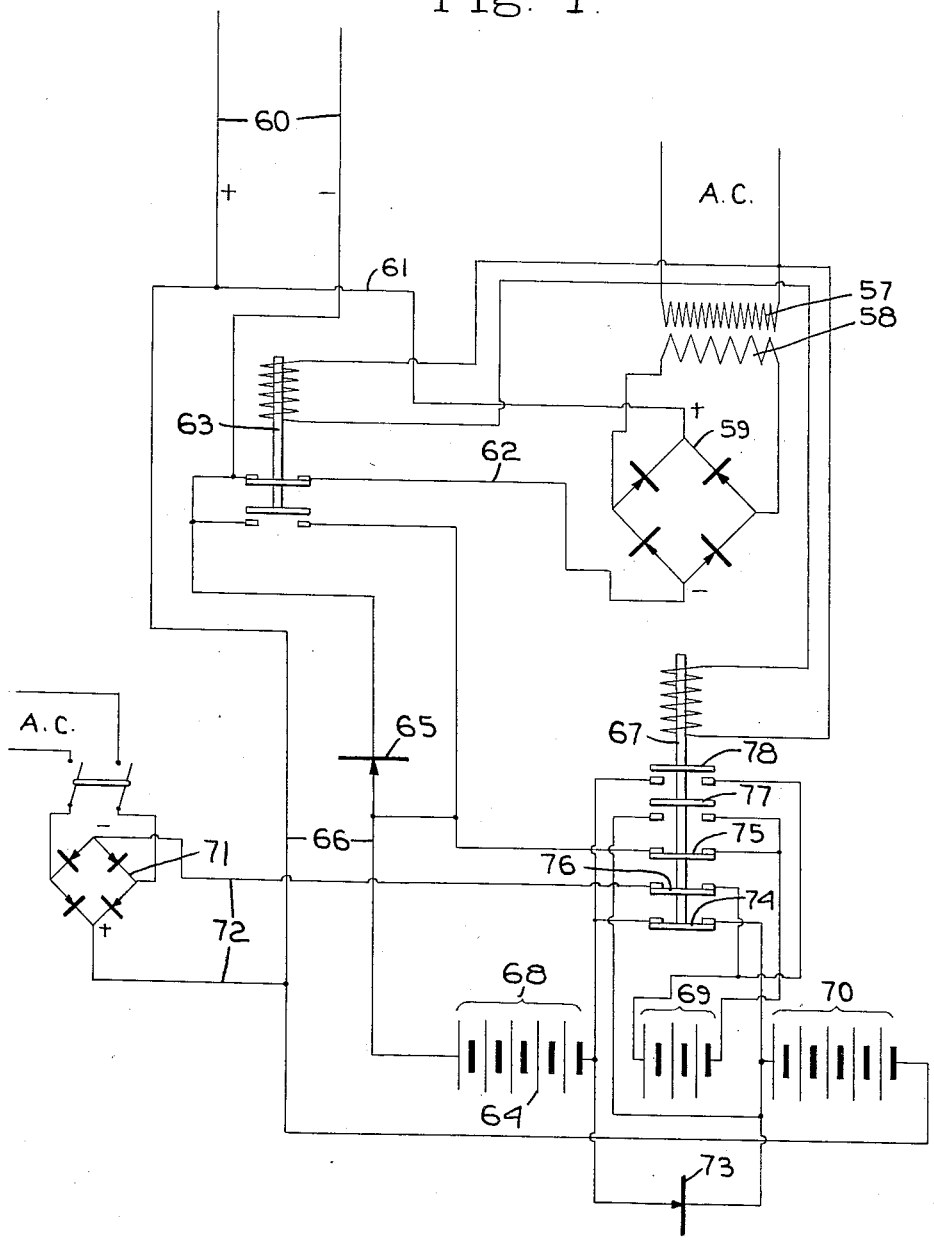
Fig. 4 is a diagrammatic view illustrating a voltage regulating power supply in which two sources of supply are employed, one of which is a pulsating direct current and the other of which is composed of a plurality of voltage generating units, the total voltage of which may be regulated to compensate for undesirable changes in voltage impressed upon the load.

The apparatus shown in Fig. 4 is designed to accomplish this purpose. A transformer 57 is supplied with alternating current which is reduced to the desired voltage in the secondary 58 of the transformer. The output of the secondary is applied to the rectifier 59. The rectified current is conducted to the load circuit 60 through the conductors 61 and 62. The load, therefore, is normally supplied with current from the rectifier. If, however, the alternating current source should fail or its voltage be substantially reduced, the automatic relay switch 63 will act to disconnect the rectifier and connect the battery source 64 to the load. In order to avoid interrupting the current flowing to the load during this change, the unidirectional conductor 65 is introduced in the circuit 66 leading from the battery. A detailed description of the functions of the unidirectional valve 65 and the switch 63 will be found in applicant's copending application, Serial No. 641,582, filed November 7, 1932, patented April 3, 1934, No. 1,953,602.

As above pointed out, means must be provided to prevent leakage of current from the battery while the rectifier is supplying the load due to the pulsating character of the current produced by the rectifier. An automatic relay switch 67 is provided which is connected to and is actuated by the alternating current source so that upon failure of the alternating current source both the switches 63 and 67 act simultaneously. It would be possible to combine the two switches so that they would be actuated by a single solenoid coil. The battery 64 is desirably divided into three groups of cells 68, 69 and 70. During the normal operation of the apparatus while the rectifier 59 is supplying current to the load the voltage of the battery 64 is determined by the number of cells in the combined groups 68 and 70 the group 69 being removed from the circuit.

If no charging device is provided to maintain the proper condition of the battery the groups of cells 69 remain idle at this time. In case a charging device 71 is incorporated in the system, the group 69 is connected in the circuit 72 of the charging device. The group 69 is so inserted in the system, however, that its voltage cannot reach the load circuit 60 but when the charging device is in operation, it is in the circuit of the charging device and receives a charge along with the other groups 68 and 70.

With the switch 67 in the position shown in the drawings, the two battery sections 68 and 70 are impressing the voltage upon the rectifier circuit equal to the minimum voltage generated thereby. Therefore no current flows from the battery through the unidirectional conductor 65. At this time the inner terminals of the battery sections 68 and 70 are interconnected by means of another unidirectional conductor 73. If desired, this connection between the two sections 68 and 70 may be made more positive by providing a closed contact arm 74 which provides a positive copper path between the two sections.

Upon interruption of the current supplied to the rectifier 59, the switch 63 acts to connect the battery 64 to the load and simultaneously the switch 67 acts to remove the group 69 from the circuit of the charging device and insert it in series with the battery sections 68 and 70, thereby adding its voltage thereto and bringing the impressed voltage upon the load up to a value equal to the mean voltage developed by the rectifier.

The switch 67 is provided with a contact arm 75 which completes the circuit from one terminal of the group 69 to one of the outside terminals of the group 68 while the other terminal of the group 69 is connected to the charging device 71 through the contact arm 76. The contact arms 74, 75 and 76 are all in their closed circuit positions while the rectifier 59 is functioning.

The switch 67 is also provided with contact arms 77 and 78 which are at this time open circuited. When the rectified current source fails or its voltage drops a substantial amount, the switch 67 drops by gravity into its lowermost position which closes the circuit connected to the contact arm 78 and the circuit connected to the contact arm 77 and opens the circuits connected to the remaining contact arms on the switch. The circuit connected to the contact arm 78 extends from the inside terminal of the group 68 to the adjacent terminal of the group 69 while the circuit connected to the contact arm 77 extends from the inside terminal of the group 70 to the adjacent terminal of the group 69. When these two circuits are closed, therefore, the group 69 becomes connected in series with the groups 68 and 70 and acts to impress the total voltage of the three groups upon the load. The total voltage of the three groups may be predetermined and may be of such a value as to maintain the voltage on the load constant or to increase the voltage on the load when the change from the rectified source to the battery source is made. During the period of time when the switch 67 is moving from its upper position to its lower position or vice versa, the unidirectional valve 73 acts to prevent interruption of current in the load circuit in the same manner as that described in connection with Fig. 1.

Another application of the invention similar to that described in connection with Figs. 1 and 4 is shown in Fig. 5. The apparatus shown in Fig. 5 is especially adapted to the lighting system of a railroad coach or other rolling stock of a railroad wherein a generator functions while the coach is in motion to supply the lights within the coach with electrical energy and also to charge a storage battery. In a system of this nature the generator must produce a voltage which is in excess of that developed by the battery in order to introduce the necessary charging current to the battery. The energy supplied by the generator, however, is intermittent and when the coach is not in motion, its voltage drops to zero, at which time the battery must supply the necessary power to the lights or other electrical appliances within the coach. Obviously without any compensating device, the voltage upon the lamps will therefore drop appreciably when the generator stops. In order to compensate for this difference in voltage, the apparatus shown in Fig. 5 automatically inserts one or more cells of the battery into the light circuit and thereby compensate for the difference in voltage and accomplishes this result with no interruption of current in the lamp circuit.

The generator 79 is shown connected to the generator circuit 80 which in turn is connected at one of its terminals to a load circuit 81 in which are connected a plurality of lamps 82. This same terminal of the generator circuit is also connected to the outer terminal 83 of the battery 84. The other terminal of the generator circuit is connectible to the battery through a contact arm 85 upon the automatic relay switch 86. The solenoid coil 87 of the switch 86 is connected across the terminals of the generator 79.

The battery 84 is divided into three sections 88, 89 and 90. The section 89 is so connected to the switch 86 that it may be connected in series with the two sections 88 and 90 or may be removed from the battery and inserted in the generator circuit 80. As shown in Fig. 5, the switch 86 is in its lowermost position and the generator 79 is idle. Under these conditions the load circuit 81 is supplied with current from the battery 84 at a voltage equal to the sum of the battery sections 88, 89 and 90. The section of the battery 89 is connected in series with the other sections through the circuit 91 and the contact arm 92 on the switch 86 and also by the circuit 93 and the contact arm 94. The voltage of the battery section 89 may be equal to the difference in voltage generated by the generator 79 and the combined voltage of the two battery sections 88 and 90. When the generator 79 stops, therefore, the voltage impressed upon the load circuit including the lamps 82 will remain constant and the current flowing to the lamps will be uninterrupted.

When the generator 79 again becomes active, its voltage energizes the solenoids 87, thereby moving the switch 86 into its uppermost position at which time the circuits 91 and 93 which are controlled by contact arms 92 and 94 are opened and the contact arm 85 acts to connect the terminal 95 of the battery section 89 to the generator circuit while the contact arm 96 of the switch acts to connect the other terminal 97 of the battery section 89 to the outer terminal 98 of the battery section 88, thereby connecting the battery section 89 in series with the generator where it will receive its quota of the charging current from the generator but will not impress its own voltage upon the load. The contact 99 also acts at this time to close the circuit between the terminals 100 and 101, respectively, of the battery sections 88 and 90, thereby completing the circuit through the battery. The generator 79 under these conditions is supplying current for the lamps 82 and also is acting to charge the battery.

A unidirectional conductor 102 is connected across the terminals 100 and 101 of the battery sections 88 and 90 and acts to prevent interruption of current during the switching operation. If the unidirectional conductor were not so connected, current flowing to the load would be interrupted when the circuits 91 and 93 are open when the battery section 89 is removed or reinserted in the battery. The circuits 91 and 93 are controlled by the switch 86 in removing and reinserting the battery section 89 in the same manner as above described in connection with Figs. 1 and 4.

An automatic cut-out 103 is inserted in series in the generator circuit 80. This cut-out is or may be of standard design and functions to insure positive actuation of the switch 86 and serves to prevent the potential of the battery from upholding the arm of the switch 86 when the solenoid 87 should be deenergized.

The unidirectional conductor 102 is connected as shown in the drawings so that the contact arm 99 of the switch 86 will act to short-circuit the unidirectional conductor after the switch has acted to remove the battery section 89 from the battery proper. It is not essential, however, to the invention in its broader aspects that the unidirectional conductor in any case be short-circuited directly after the unidirectional conductor has acted. When the load consumes only a small amount of current, the unidirectional conductor will serve efficiently to carry the current indefinitely. In many applications of the invention, however, it is desirable to conduct a substantial amount of current, in which case it becomes desirable to short-circuit the unidirectional conductor directly after it has acted to prevent interruption of current flow. During the short interval consumed by the necessary switching operation, the unidirectional conductor has a current carrying capacity many times greater than its capacity to carry current over an extended period of time. By allowing the unidirectional conductor to carry the load current only momentarily during the switching operation and thereafter short-circuiting it to provide a practically unlimited current carrying capacity, a unidirectional conductor of comparatively small size will serve as an efficient means to prevent interruption of current flow in any of the forms of the invention above disclosed or any other adaptations of the invention within the scope of the claims.

It will be understood that in any of the above described embodiments of the invention, other types of switches than those described and other arrangements of the connections to the various elements may be made to accomplish the results as set forth.

The battery section 89 when shifted into the generator circuit 80 may have its individual subdivisions connected in series or in parallel or in a combination series-parallel arrangement. A desirable arrangement is to connect the subdivisions in series when the shifted section 89 is inserted in the battery circuit and to change the series connection to parallel connection when the section is inserted in the generator circuit. This change of connections is desirably accomplished by automatic means. A desirable means for accomplishing this end is shown in Fig. 6, in which a solenoid-operated switch 104 acts automatically to make the change in connections. The switch 104 is actuated by a solenoid 105 which is connected in the generator circuit 80. The output terminals of the switching arrangement shown in Fig. 6 are connected to the wire in the circuit 93, which connects with the battery section 89, and the wire of the circuit 91, which connects with the battery 89.

As shown in Fig. 6, the generator 79 is active, in which case the solenoid 87 of the switch 86 and the solenoid 105 of the switch 104 will be energized and the battery section 89 be shifted into the generator circuit. The switch 104 at this time will act to connect the subdivisions of the section 89 in parallel. The contact arm 106 of the switch 104 is acting to connect all of the positive terminals of the subdivisions to the wire 93 while the contact arm 107 is acting to connect all of the minus terminals of the subdivisions to the wire 91. When the generator 79 becomes inactive, the switch 104 will act by gravity to disconnect the parallel arrangement and to connect the subdivisions in series through the remaining contact arms 108 on the switch 104. Simultaneously, the switch 86 will act to insert the battery section 89 in its position in the battery circuit.

Having thus described the invention, what is claimed as new, and desired to be secured by Letters Patent, is:

1. Voltage-regulating power supply apparatus comprising a load circuit, a source of electrical energy feeding said load circuit, said source having a plurality of voltage generating units connected in series, unidirectional conductors of the dry contact type having a high initial and a low continuous current capacity connectable in parallel with each of said units and connectable in series with the units adjacent the units embraced by such parallel connection acting to prevent flow of current locally from said embraced units through said unidirectional conductors, switching means operable to disconnect or reconnect said embraced units with said source and means for short-circuiting said unidirectional conductors after the operation of the switching means to remove one or more of said units from the load circuit whereby said unidirectional conductors will act to maintain closed the load circuit containing the active units during the connection or disconnection of said embraced units and thereby to maintain an uninterrupted current in said load circuit.

2. Voltage-regulating power supply apparatus comprising a load circuit, two sources of electrical energy arranged to feed said load circuit, a primary source and a tapped secondary source capable of delivering a plurality of voltage values, automatic switching means for connecting said load circuit selectively with taps upon said secondary source to secure a predetermined voltage in the load circuit when the primary source is interrupted or its voltage drops below a predetermined value and a dry contact type unidirectional conductor having a high initial and a low continuous current capacity, acting to maintain the load circuit containing the active portion of the sources closed during the operation of the switching means and thereby to maintain an uninterrupted current in the load circuit.

3. Voltage-regulating power supply apparatus comprising a load circuit, a source of electric energy having a plurality of voltage generating units connected in series, a plurality of switches connected to a plurality of said voltage generating units, said switches being operable to connect all of said units in series or selectively to disconnect one or a plurality of said units from said source and a dry contact type unidirectional conductor having a high initial and a low continuous current capacity for each of said switches acting to maintain the load circuit containing the active units closed during the operation of the switches and thereby to maintain an uninterrupted current in said load circuit.

4. Voltage-regulating power supply apparatus having the elements defined in claim 3, together with means for short-circuiting each of said unidirectional conductors after an operation of the switching means to remove a unit connected to it.

5. In a voltage-regulating power supply apparatus acting to feed a load circuit and having a plurality of voltage generating units connected in series, a switching means comprising a switch arm operable to cut in or cut out one of said voltage generating units, a contact arm on said switch arm acting in the cut in position to close the circuit between said units and acting in the cut out position to open the circuit between said units, a dry contact type unidirectional conductor having a high initial and a low continuous current capacity, a second contact arm on said switch arm acting at an intermediate position of said switch arm between cut in and cut out positions and before the first contact arm opens its circuit to connect said unidirectional conductor between the terminals of the units adjacent the unit removed by said switching means and a third contact arm acting to short-circuit said unidirectional conductor in the cut out position of said switch arm.

6. Voltage-regulating power supply apparatus comprising a load circuit, a multicell battery connected to said load circuit, an intermittently operated current source connectable to both said battery and said load circuit and when so connected acting to supply current to both of these elements, automatic switching means acting to change the voltage impressed upon said load circuit when said intermittent source is out of operation by adding to or withdrawing from the total number of battery cells in said load circuit said switching means including a dry contact type unidirectional conductor having a high initial and a low continuous current capacity acting to maintain the load circuit containing the active elements closed during the switching operation and thereby to maintain an uninterrupted current in said load circuit.

7. Voltage-regulating power supply apparatus comprising a load circuit, a multicell battery connected to said load circuit, a primary source of direct current, a primary circuit for conducting current from the primary source to the load, switching means acting intermittently to connect said primary source to the battery and the load, a transferable section of said battery situated in said primary circuit while said primary source is functioning, automatic switching means acting to remove said transferable section from said primary circuit and insert it in said load circuit in series with said battery when said primary source is interrupted or its voltage drops below a predetermined value, and a dry contact type unidirectional conductor having a high initial and a low continuous current capacity connected in parallel with said transferable section and to the terminals of adjacent terminals of said battery, said unidirectional conductor acting to prevent discharge of said transferable battery section and to permit current to flow uninterruptedly to said load circuit during the switching operation.

8. Voltage-regulating power supply apparatus comprising a load circuit, a source of pulsating rectified current, a reserve source of direct current having a plurality of voltage generating units connected in series, said reserve source normally delivering a voltage substantially equal to the minimum instantaneous voltage delivered by said pulsating current, each of said sources being connected to said load circuit, a dry contact type unidirectional conductor having a high initial and a low continuous current capacity connected in series between said rectified source and said reserve source acting normally to prevent flow of current from said rectified source to said reserve source and permitting current to flow from said reserve source upon interruption or reduction in voltage of said rectified source, automatic switching means acting to increase the voltage of said reserve source to equal or exceed the mean voltage of said rectified source upon interruption or a reduction in voltage thereof by changing connections on said reserve source to include one or more added units in series therewith and a dry contact type unidirectional conductor having a high initial and a low continuous current capacity connected in parallel with the added unit or units and acting normally to prevent local current flow from said added unit or units through said unidirectional conductor and its parallel circuit and acting to maintain the load circuit closed during the switching operation and thereby to maintain an uninterrupted current in said load circuit.

9. Voltage-regulating power supply apparatus comprising a load circuit, two sources of electrical energy, one of which is a multi-unit source having a plurality of voltage-generating units, one of said sources having a higher voltage than the other, means for connecting either the multi-unit or both of said sources to said load circuit, automatic switching means operable to change connections to include the required number of units of said multi-unit source thereby to change the voltage of said multi-unit source to equal the voltage of the other source when the change of connections is made to feed current to the load from said multi-unit source alone and a dry contact type unidirectional conductor having a high initial and a low continuous current capacity acting to maintain the load circuit containing the active source closed during the operation of the switching means and thereby to maintain an uninterrupted current in the load circuit.

10. Voltage-regulating power supply apparatus having the elements defined in claim 7, together with switching means for changing connections between the subdivisions of said transferable section while said section is being transferred from its position in the battery to its position in the primary circuit.

11. Voltage-regulating power supply apparatus comprising a load circuit, a source of electrical energy having a plurality of voltage generating units, switching means acting automatically upon a change in the voltage in said load circuit to impress a desired voltage thereon by changing the connections to include the said units required in said load circuit and a dry contact type unidirectional conductor having a high initial and a low continuous current capacity, acting to maintain the load circuit containing the active units closed during the operation of the switching means and thereby to maintain an uninterrupted current in the load creuit and automatic means operable to short-circuit said unidirectional conductor after an operation of the switching means to remove one or more of said units from the load circuit.

12. Voltage-regulating power supply apparatus having the elements defined in claim 6, together with means acting automatically to short-circuit the unidirectional conductor after the operation of the switching means to remove the unit connected to it.

JOHN J. HANLEY.